(12) United States Patent
Wei et al.

(10) Patent No.: US 12,375,997 B2
(45) Date of Patent: Jul. 29, 2025

(54) REMOTE COST BASED NETWORK TRAFFIC STEERING FOR HETEROGENEOUS LINKS IN A SDWAN (SOFTWARE DEFINED WIDE AREA NETWORK)

(71) Applicant: Fortinet, Inc., Sunnyvale, CA (US)

(72) Inventors: Shengyang Wei, Burnaby (CA); Shangwei Duan, Vancouver (CA)

(73) Assignee: Fortinet, Inc., Sunnyvale, CA (US)

( * ) Notice: Subject to any disclaimer, the term of this patent is extended or adjusted under 35 U.S.C. 154(b) by 392 days.

(21) Appl. No.: 17/958,267

(22) Filed: Sep. 30, 2022

(65) Prior Publication Data
US 2024/0114425 A1    Apr. 4, 2024

(51) Int. Cl.
*H04W 40/12* (2009.01)
*H04L 9/08* (2006.01)
*H04W 40/30* (2009.01)

(52) U.S. Cl.
CPC ......... *H04W 40/125* (2013.01); *H04L 9/0825* (2013.01); *H04W 40/30* (2013.01)

(58) Field of Classification Search
CPC .... H04W 40/125; H04W 40/30; H04L 9/0825

USPC ........................................................ 370/252
See application file for complete search history.

(56) References Cited

U.S. PATENT DOCUMENTS

| | | | |
|---|---|---|---|
| 11,558,354 B2 * | 1/2023 | Mestery | H04L 63/166 |
| 11,563,601 B1 * | 1/2023 | K S | H04L 41/0816 |
| 2020/0295984 A1 * | 9/2020 | Qian | H04L 41/0853 |
| 2023/0041916 A1 * | 2/2023 | Zhang | H04L 63/029 |
| 2024/0414024 A1 * | 12/2024 | Shen | H04L 61/5014 |

* cited by examiner

*Primary Examiner* — Faisal Choudhury
(74) *Attorney, Agent, or Firm* — Law Office of Dorian Cartwright; Dorian Cartwright

(57) ABSTRACT

During authentication of an SDWAN tunnel, Intent ISAKMP packets authenticate the local SDWAN controller and the remote SDWAN controller with each other, wherein the ISAKMP packets include a notify payload. Configured link costs associated with at least two member paths at the remote SDWAN controller that have heterogeneous physical attributes from the notify payload of the ISAKMP packets are retrieved. The configured link-cost of the at least two member paths is reflective of link physical attributes. One of the at least two member paths is identified based on a lowest link-cost between the at least two member paths, for steering SDWAN network traffic.

20 Claims, 5 Drawing Sheets

REMOTE COST BASED NETWORK TRAFFIC STEERING FOR HETEROGENEOUS LINKS IN A SDWAN (SOFTWARE DEFINED WIDE AREA NETWORK)

CROSS-REFERENCE TO RELATED APPLICATIONS

This application claim priority under 35 USC 120 to U.S. application Ser. No. 17/517,655, filed Nov. 2, 2021, by Shangwei Duan, the contents of which are hereby incorporated in their entirety.

FIELD OF THE INVENTION

The invention relates generally to computer networking, and more specifically, to steering network traffic on heterogenous links in SDWAN based on remote cost.

BACKGROUND

The state-of-art secured SD-WAN (Software Defined Wide Area Network) steers traffic among IPSEC (Internet Protocol security) tunnels. It is an Internet Engineering Task Force (IETF) standard suite of protocols between 2 communication points across the IP network that provide data authentication, integrity, and confidentiality. It also defines the encrypted, decrypted and authenticated packets.

However, although these IPSEC tunnels are logically consistent from the view of SDWAN, they are built on heterogeneous physical links. The local end of a tunnel could be built on the high-speed broadband link, while the remote end is built on the LTE (long-term evolution) wireless link. This tunnel is expected to get a lower priority to steer traffic because LTE could incur expensive cost although it may keep a good quality. Unfortunately, the local SDWAN has no knowledge of the remote end. The knowledge cannot be acquired by the current quality detection techniques, such as sending probes periodically, either. Customers are calling for an innovation to guide the SDWAN to steer traffic based on the remote end's information.

Therefore, what is needed is a robust technique for steering network traffic on heterogenous links in SDWAN based on remote cost.

SUMMARY

These shortcomings are addressed by the present disclosure of methods, computer program products, and systems for steering network traffic on heterogenous links in SDWAN based on remote cost.

In an embodiment, authentication of the local SDWAN controller with a remote SDWAN controller is initiated to create a tunnel between the local SDWAN controller and the remote SDWAN controller, by exchanging IKE packets. Intent Security Association Key Management Protocol (ISAKMP) packets are exchanged to authenticate the local SDWAN controller and the remote SDWAN controller with each other, wherein the ISAKMP packets include a notify payload.

In another embodiment, at least two configured link costs associated with at least two member paths at the remote SDWAN controller that have heterogeneous physical attributes from the notify payload of the ISAKMP packets are retrieved. The configured link-cost of the at least two member paths is reflective of link physical attributes. One of the at least two member paths is identified based on a lowest link-cost between the at least two member paths.

SDWAN network traffic is steered between the local SDWAN controller and the remote SDWAN based on which of the at least two member paths has a highest quality. Responsive to having substantially the same quality, the identified member path having the lowest link-cost is selected.

Advantageously, link-cost is identified early, during tunnel creation. As a result, computer network performance is improved for networking devices.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for steering network traffic on heterogenous links in SDWAN based on remote cost.

One of ordinary skill in the art will recognize many additional variations made possible by the succinct description of techniques below.

Figure 2:
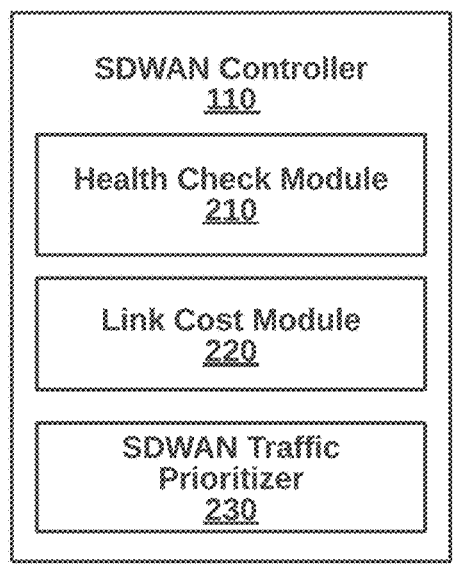
FIG. 2 is a more detailed block diagram illustrating an SDWAN controller the system of FIG. 1, according to an embodiment.
Figure 3:
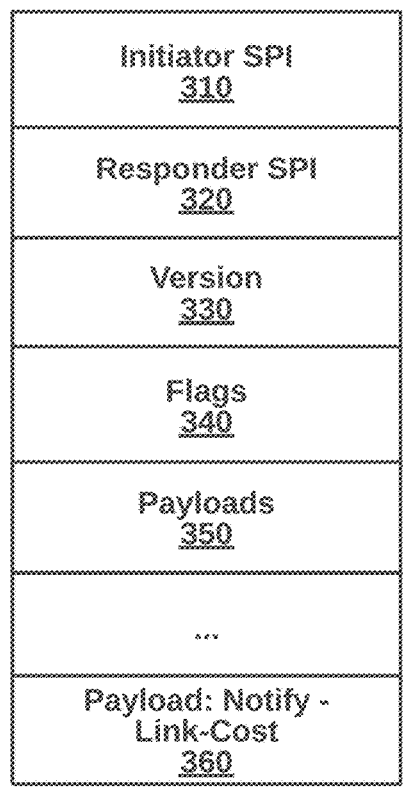
FIG. 3 is a block diagram illustrating an ISAKMP packet for authentication, according to an embodiment.

I. Systems for SDWAN Link Traffic Prioritizing (FIGS. 1-3)

Figure 1:
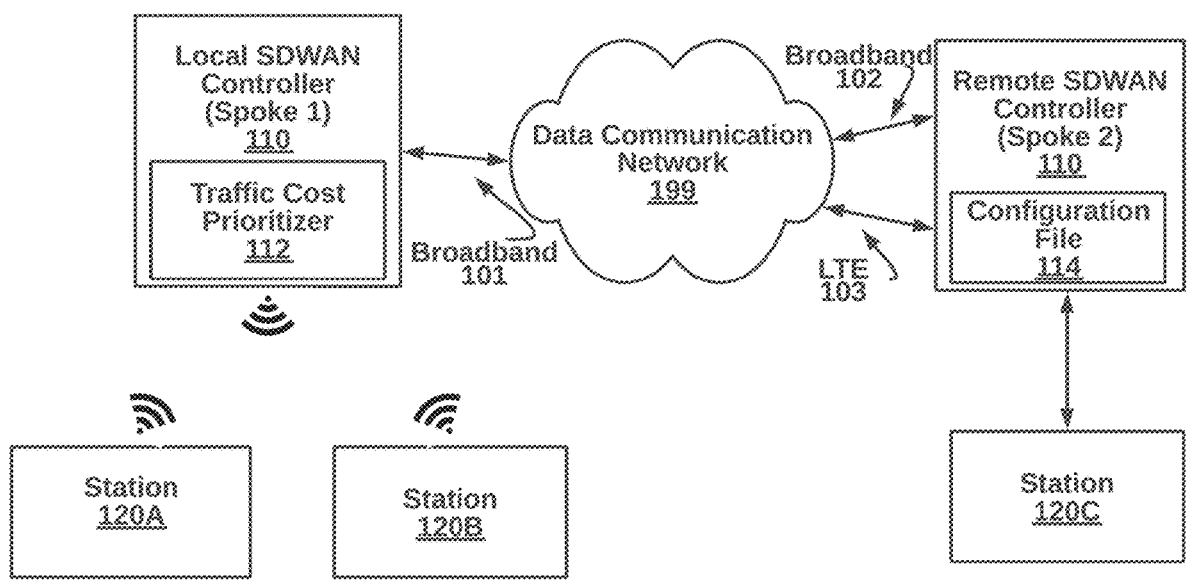
FIG. 1 is a high-level block diagram illustrating a system for steering network traffic on heterogenous links in SDWAN based on remote cost, according to an embodiment.

FIG. 1 is a high-level illustration of a system 100 for steering network traffic on heterogenous links in SDWAN based on remote cost, according to an embodiment. A local SDWAN controller 110A is coupled to Remote SDWAN controllers 120B,C. Local and remote are relative terms depending on which side of the SDWAN is building VPNs (Virtual Private Networks). Many variations are possible, including additional (or single) SDWAN controllers, access points, gateways, router, switches, firewalls, and other network components.

The components of the system 100 are coupled in communication over the data communication network 199. Preferably, the access point 110 connected to the data communication system via hard wire, such as local SDWAN controller 110A, remote SDWAN controllers 110B,C and station 120C. Other components, such as the headless IoT devices can be connected indirectly via wireless connection, such as stations 120A,B. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the local SDWAN controller 110A includes a traffic cost prioritizer 112 to determine a cost for each heterogenous remote link available for routing, without having direct visibility. During establishment of tunnels, prior to a health check for links with remote SDWAN controllers 110B,C, a remote cost is also identified. Generally, ISAKMP is part of the Internet key exchange for setting up phase one of the tunnel. IKE establishes the shared security policy and authentication keys, while ISAKMP is the protocol the specifies the mechanics of the key exchange.

Heterogeneous links can have different costs. For example, a first VPN may be a broadband link 102 assigned a cost of 10 while a second VPN may be a much slower LTE link 103 is assigned a cost of 100. Other types of links can also have different cost assignments. As a result, the local SDWAN controller 110A prioritizes network traffic based on the remote cost. Higher cost traffic over the LTE link 103 may be deprioritized relative to traffic over the broadband link 102, or others.

The local SDWAN controller 110A and the remote SDWAN controllers 110B,C can be a sever blade in an array of server blades, a PC (personal computer), a mobile computing device, a laptop device, a smartphone, a tablet device, a phablet device, a video game console, a stationary computing device, an Internet appliance, a virtual computing device, a distributed computing device, a cloud-based computing device, or any appropriate processor-driven device. Physical attributes of a local link are known to the local SDWAN controller 110A, however, physical attributes of remote links are unknown until probed. More details about SDWAN controllers are set forth below with respect to FIG. 2.

The remote SDWAN controller 110B,C receives health check requests from the local SDWAN controller 110A and others. More specifically, a health check probe request is received from the local SDWAN controller 110A requesting details about back-end links managed by the remote SDWAN controller 110B,C because the local SDWAN controller 110A has no visibility. The requested details can include, for each link, latency, jitter, and packet loss. In addition, details are requested about remote links. In one embodiment, a configuration file 114 is updated in the remote SDWAN controller 110B,C by a network administrator to include remote costs. One example of the configuration file is as follows:
  config system sdwan
    config member
      edit 1
      set interface broadband
      set cost 10 -------------------- The cost reflects the attribute of member link
      next
      edit 2
      set interface LTE
      set cost 100
      next
    end The stations 120A,B,C are end points, such as a user with a laptop or a smartphone. Stations 120 and 120B are wirelessly connected to the backbone network while station 130C is connected by wire. Although stations 120A and 120B can be geographically separated from station 120C, SDWAN provides a virtual interface that substantially negates the geographical separation. For instance, station 120A may interact with station 120C in the same capacity as station 120B. Link quality is thus an important factor in maintaining the virtual interface.

FIG. 2 is a more detailed block diagram illustrating the local SDWAN controller 110 of the system 100 of FIG. 1, according to one preferred embodiment. The local SDWAN controller 110 comprises an IKE module 210, a link cost determination module 220, and an SDWAN traffic prioritizer 230.

The IKE module 210, in an embodiment, initiates authentication of the local SDWAN controller with a remote SDWAN controller, to create a tunnel between the local SDWAN controller and the remote SDWAN controller, by exchanging IKE packets to exchange ISAKMP packets to authenticate the local SDWAN controller and the remote SDWAN controller with each other, wherein the ISAKMP packets include a notify payload. Other embodiment utilize different aspects of tunnel creation for early link-cost exchange. In some embodiments, health probes are sent after authentication is completed. Link-costs can also be sent at this stage, or updated at this stage.

The link cost module 220 retrieves at least two configured link costs associated with at least two member paths at the remote SDWAN controller that have heterogeneous physical attributes from the notify payload of the ISAKMP packets, wherein the configured link-cost of the at least two member paths is reflective of link physical attributes, the link cost module to identify one of the at least two member paths based on a lowest link-cost between the at least two member paths; and The SDWAN traffic prioritizer 230 can steer SDWAN network traffic between the local SDWAN controller and the remote SDWAN based on which of the at least two member paths has a highest quality, and responsive to having substantially the same quality, selecting the identified member path having the lowest link-cost.

FIG. 3 is a block diagram illustrating an ISAKMP packet for authentication, according to an embodiment. The ISAKMP packet fields include an initiator SPI 310, a responder SPI 320, a version 330, flags 340, payloads 350 and payload: notify-link-cost 360. Many other fields can be included.

II. Methods SDWAN Link Traffic Prioritizing (FIG. 4-5)

Figure 4:
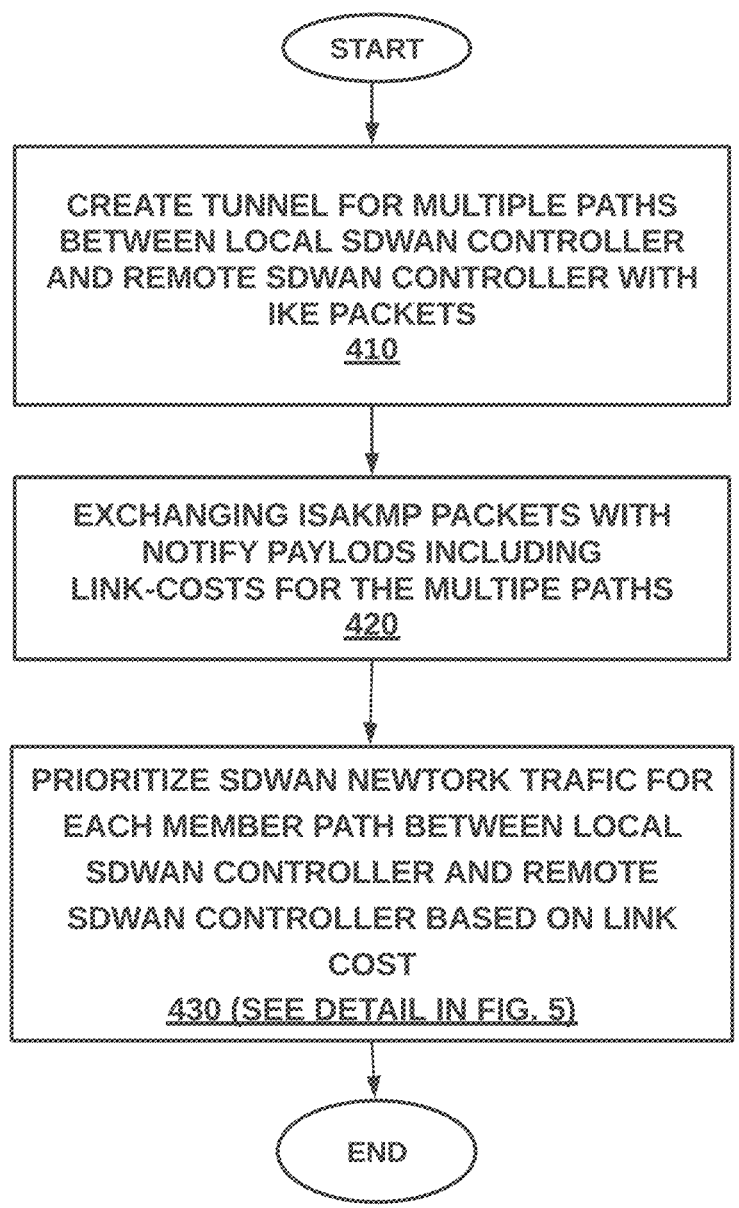
FIG. 4 is a high-level flow diagram illustrating a method for steering network traffic on heterogenous links in SDWAN based on remote cost, according to an embodiment.
Figure 5:
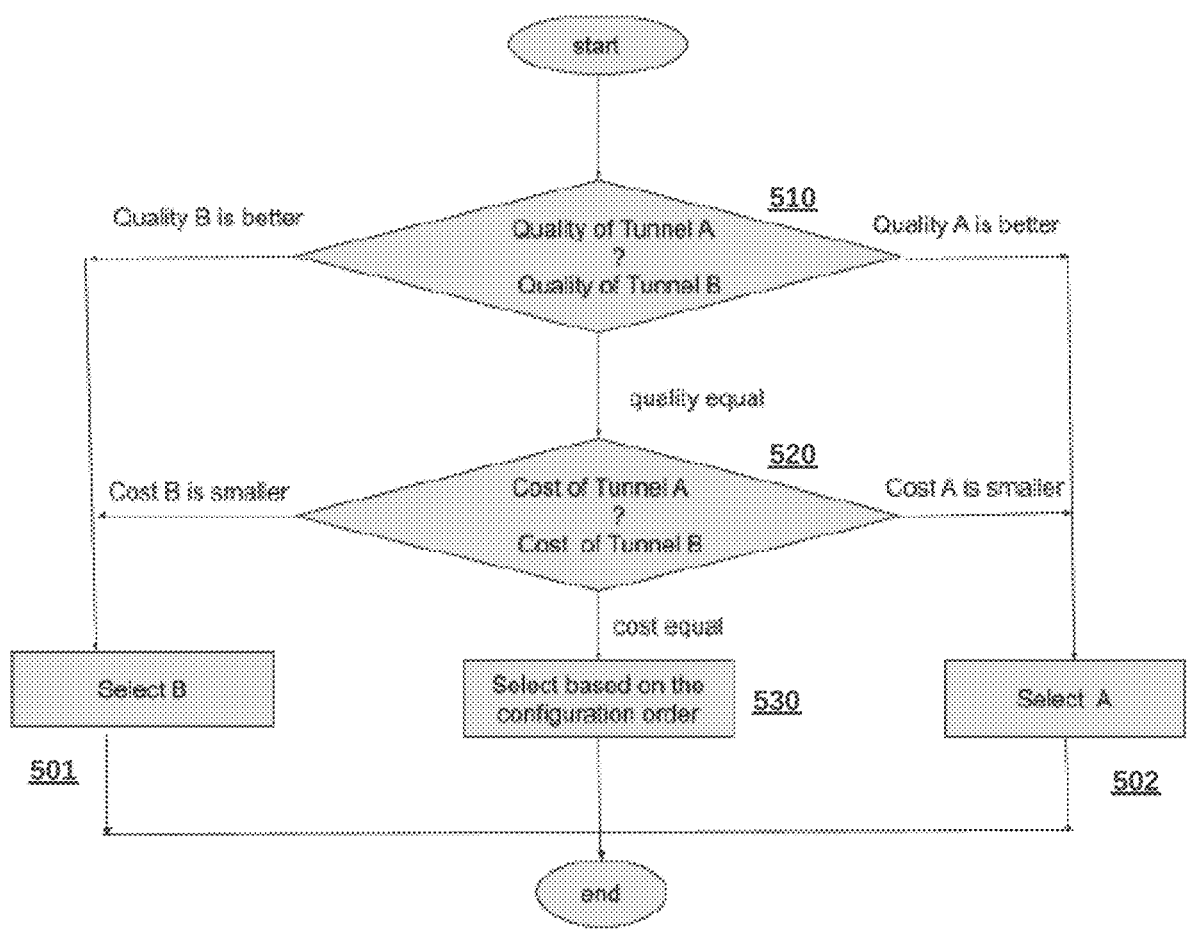
FIG. 5 is a more detailed flow diagram illustrating a step of prioritizing SDWAN network traffic of the method of FIG. 4, according to an embodiment.

FIG. 4 is a high-level flow diagram illustrating a method 40 for steering network traffic on heterogenous links in SDWAN based on remote cost, according to one embodiment. The method 300 can be implemented, for example, by the system 100 of FIG. 1. The steps are merely representative groupings of functionality, as there can be more or fewer steps, and the steps can be performed in different orders. Many other variations of the method 400 are possible.

At step 410, authentication of the local SDWAN controller with a remote SDWAN controller is initiated to create a tunnel between the local SDWAN controller and the remote SDWAN controller, by exchanging Internet Key Exchange (IKE), the IKE module to exchange Intent Security Association Key Management Protocol (ISAKMP) packets to authenticate the local SDWAN controller and the remote SDWAN controller with each other, wherein the ISAKMP packets include a notify payload.

At step 420, at least two configured link costs associated with at least two member paths at the remote SDWAN controller that have heterogeneous physical attributes from the notify payload of the ISAKMP packets are retrieved. The configured link-cost of the at least two member paths is reflective of link physical attributes. One of the at least two member paths is identified based on a lowest link-cost between the at least two member paths.

At step 430, SDWAN network traffic is steered between the local SDWAN controller and the remote SDWAN based on which of the at least two member paths has a highest quality. Responsive to having substantially the same quality, the identified member path having the lowest link-cost is selected. An example prioritization algorithm is shown in FIG. 5. At step 510, if the quality of tunnel A or tunnel B is better, a choice is made as select A 501 or select B 502. Responsive to similar or equal quality, a cost of tunnel A is compared against a cost of tunnel B, and a smaller cost can be chosen at this point as select A 501 or select B 502. At step 530, if the costs are equal or similar, a tunnel selection (e.g., IPSEC tunnel) can be based on configuration order.

III. Computing Environment for SDWAN Link Prioritizing (FIG. 6)

Figure 6:
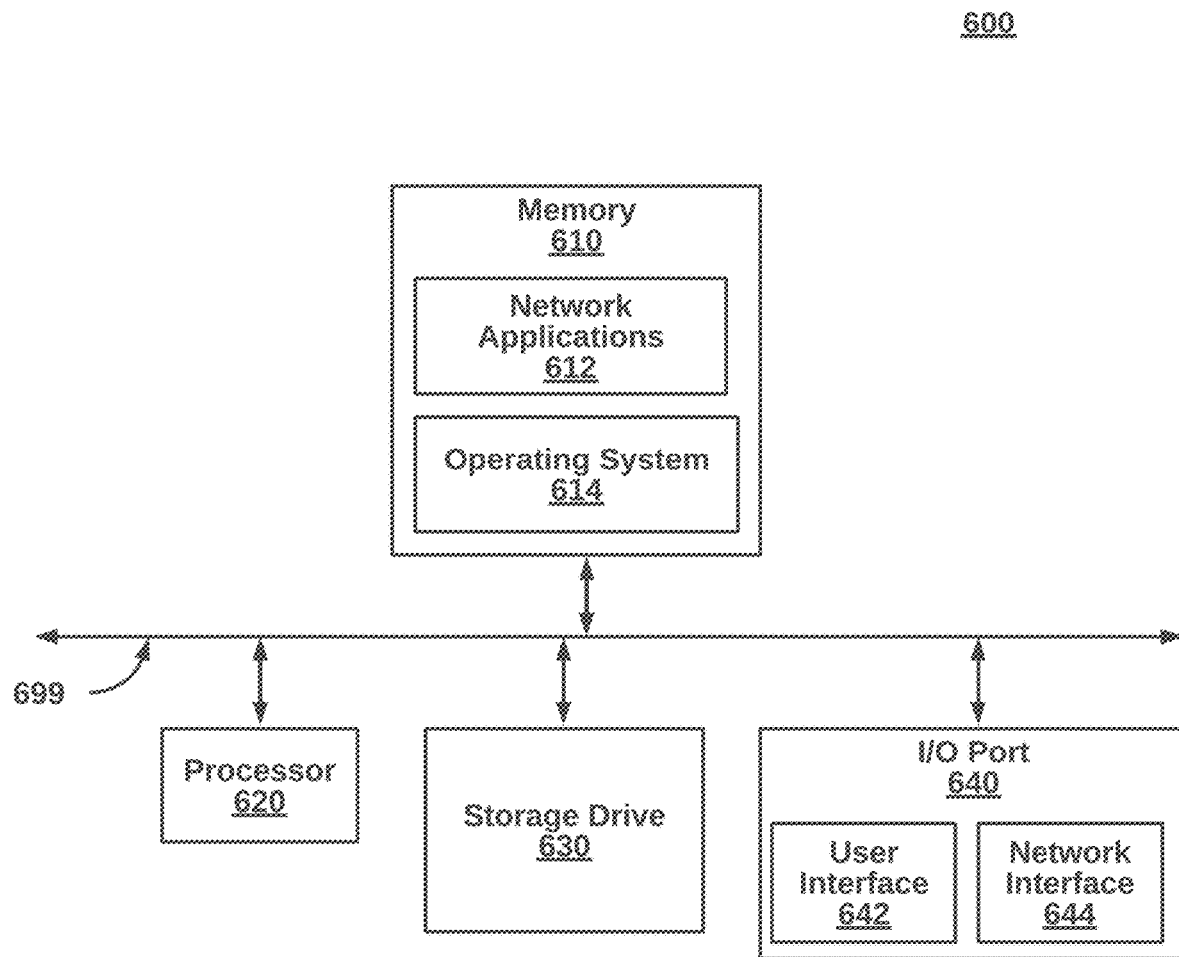
FIG. 6 is a general computing environment for implementing the system of FIG. 1, according to an embodiment.

FIG. 6 is a block diagram of a computing environment 600, according to an embodiment. The computing environment 600 includes a memory 605, a processor 622, a storage drive 630, and an I/O port 640. Each of the components is coupled for electronic communication via a bus 699. Communication can be digital and/or analog and use any suitable protocol. The computing environment 600 can be a networking device (e.g., the local SDWAN controller 110A, the remote SDWAN controllers 110B,C, an access point, a firewall device, a gateway, a router, or a wireless station).

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 622 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 622 can be single core, multiple core, or include more than one processing elements. The processor 622 can be disposed on silicon or any other suitable material. The processor 622 can receive and execute instructions and data stored in the memory 222 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A local SDWAN (software defined wide area network) controller for steering network traffic on heterogenous links in SDWAN based on remote cost, the local SDWAN controller comprising:
   a processor;
   a network interface communicatively coupled to the data communication network and to the enterprise network; and
   a memory, communicatively coupled to the processor and storing:
      an IKE module to initiate authentication of the local SDWAN controller with a remote SDWAN controller, to create a tunnel between the local SDWAN controller and the remote SDWAN controller, by exchanging Internet Key Exchange (IKE) packets, the IKE module to exchange Intent Security Association Key Management Protocol (ISAKMP) packets to authenticate the local SDWAN controller and the remote SDWAN controller with each other, wherein the ISAKMP packets include a notify payload;
      a link cost module to retrieve at least two configured link costs associated with at least two member paths at the remote SDWAN controller that have heterogeneous physical attributes from the notify payload of the ISAKMP packets, wherein the configured link-cost of the at least two member paths is reflective of link physical attributes, the link cost module to identify one of the at least two member paths based on a lowest link-cost between the at least two member paths; and
      an SDWAN traffic prioritizer to steer SDWAN network traffic between the local SDWAN controller and the remote SDWAN based on which of the at least two member paths has a highest quality, and responsive to having substantially the same quality, selecting the identified member path having the lowest link-cost.

2. The SDWAN server of claim 1, wherein the health check module generates the health check at least in part from latency, jitter, and packet loss of the set of probe packets.

3. The local SDWAN controller of claim 1, wherein the health check module generates the health check from at least in part from sequence number and round-trip time of the set of probe packets.

4. The local SDWAN controller of claim 1, wherein the link selector prioritizes each member path for selection based at least in part on health check results and link costs.

5. The local SDWAN controller of claim 1, wherein the link selector prioritizes each member path for selection based at least in part on health check results, link costs, and configuration order of links.

6. The local SDWAN controller of claim 1, wherein a cost of an LTE link is higher than a cost of a broadband link.

7. The local SDWAN controller of claim 1, further comprising a configuration file on the remote SDWAN controller, wherein the configuration file sets link costs for each link.

8. The local SDWAN controller of claim 1, wherein the health check probe comprises a header field, a timestamp field, and a cost field.

9. The local SDWAN controller of claim 1, wherein the remote SDWAN controller comprise two or more links.

10. The local SDWAN controller of claim 1, wherein the SDWAN traffic prioritizer prioritizes SDWAN network traffic for each member path between the local SDWAN controller and a plurality of remote SDWAN controllers including the remote SDWAN controller, based at least in part on the link cost.

11. The local SDWAN controller of claim 1, wherein the at least two member paths comprise a first VPN and a second VPN over IPSEC, the first VPN comprising a broadband-to-broadband physical link and the second VPM comprising a broadband to LTE physical link.

12. A method in a local SDWAN (software defined wide area network) controller for steering network traffic on heterogenous links in SDWAN based on remote cost, the method comprising the steps of:
   initiating authentication of the local SDWAN controller with a remote SDWAN controller, to create a tunnel between the local SDWAN controller and the remote SDWAN controller, by exchanging Internet Key Exchange (IKE) packets;
   exchanging Intent Security Association Key Management Protocol (ISAKMP) packets to authenticate the local SDWAN controller and the remote SDWAN controller with each other, wherein the ISAKMP packets include a notify payload;
   retrieving at least two configured link costs associated with at least two member paths at the remote SDWAN controller that have heterogeneous physical attributes from the notify payload of the ISAKMP packets, wherein the configured link-cost of the at least two member paths is reflective of link physical attributes;

identifying one of the at least two member paths based on a lowest link-cost between the at least two member paths; and steering SDWAN network traffic between the local SDWAN controller and the remote SDWAN based on which of the at least two member paths has a highest quality, and responsive to having substantially the same quality, selecting the identified member path having the lowest link-cost.

13. The method of claim 12, wherein the health check module generates the health check at least in part from latency, jitter, and packet loss of the set of probe packets.

14. The method of claim 12, wherein the health check module generates the health check from at least in part from sequence number and round-trip time of the set of probe packets.

15. The method of claim 12, wherein the link selector prioritizes each member path for selection based at least in part on health check results and link costs.

16. The method of claim 12, wherein the link selector prioritizes each member path for selection based at least in part on health check results, link costs, and configuration order of links.

17. The method of claim 12, wherein a cost of an LTE link is higher than a cost of a broadband link.

18. The method of claim 12, further comprising a configuration file on the remote SDWAN controller, wherein the configuration file sets link costs for each link.

19. The method of claim 12, wherein the health check probe comprises a header field, a timestamp field, and a cost field.

20. A non-transitory computer-readable media storing source code in a local SDWAN (software defined wide area network) controller, implemented at least partially in hardware for, when executed by a processor, performing a method for steering network traffic on heterogenous links in SDWAN based on remote cost, the method comprising the steps of:

initiating authentication of the local SDWAN controller with a remote SDWAN controller, to create a tunnel between the local SDWAN controller and the remote SDWAN controller, by exchanging Internet Key Exchange (IKE) packets;

exchanging Intent Security Association Key Management Protocol (ISAKMP) packets to authenticate the local SDWAN controller and the remote SDWAN controller with each other, wherein the ISAKMP packets include a notify payload;

retrieving at least two configured link costs associated with at least two member paths at the remote SDWAN controller that have heterogeneous physical attributes from the notify payload of the ISAKMP packets, wherein the configured link-cost of the at least two member paths is reflective of link physical attributes;

identifying one of the at least two member paths based on a lowest link-cost between the at least two member paths; and steering SDWAN network traffic between the local SDWAN controller and the remote SDWAN based on which of the at least two member paths has a highest quality, and responsive to having substantially the same quality, selecting the identified member path having the lowest link-cost.

* * * * *